(12) United States Patent
Pierucci et al.

(10) Patent No.: US 9,248,378 B2
(45) Date of Patent: Feb. 2, 2016

(54) METHOD AND APPARATUS FOR REMOTE RACING

(75) Inventors: Joe Phillip Pierucci, West Bloomfield, MI (US); Shawn Daniel Brozovich, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 13/587,058

(22) Filed: Aug. 16, 2012

(65) Prior Publication Data

US 2014/0051489 A1    Feb. 20, 2014

(51) Int. Cl.
| | | |
|---|---|---|
| A63F 9/24 | (2006.01) | |
| A63F 13/00 | (2014.01) | |
| A63F 13/803 | (2014.01) | |
| A63F 13/795 | (2014.01) | |

(52) U.S. Cl.
CPC .......... *A63F 13/803* (2014.09); *A63F 13/795* (2014.09)

(58) Field of Classification Search
USPC ....................................... 463/6, 25
See application file for complete search history.

(56) References Cited

U.S. PATENT DOCUMENTS

| | | | | |
|---|---|---|---|---|
| 4,814,896 A * | 3/1989 | Heitzman et al. | ............. | 386/239 |
| 5,865,624 A * | 2/1999 | Hayashigawa | ................. | 434/66 |
| 6,080,063 A * | 6/2000 | Khosla | ............................. | 463/42 |
| 6,155,927 A * | 12/2000 | Levasseur et al. | .............. | 463/42 |
| 6,322,451 B1 * | 11/2001 | Miura | ............................. | 463/42 |
| 6,422,939 B1 * | 7/2002 | Koyama et al. | ................... | 463/6 |
| 6,612,925 B1 * | 9/2003 | Forsberg | ........................... | 463/6 |
| 6,632,138 B1 * | 10/2003 | Serizawa et al. | ................. | 463/6 |
| 6,726,567 B1 * | 4/2004 | Khosla | ............................. | 463/42 |
| 6,735,435 B2 * | 5/2004 | Newell et al. | .................. | 455/419 |
| 6,954,695 B2 * | 10/2005 | Bonilla et al. | ..................... | 701/2 |
| 7,090,577 B2 * | 8/2006 | Serizawa et al. | ................. | 463/6 |
| 7,211,000 B2 * | 5/2007 | Jutzi et al. | ........................ | 463/40 |
| 7,214,133 B2 * | 5/2007 | Jen et al. | ......................... | 463/42 |
| 7,351,138 B2 * | 4/2008 | Busse et al. | ........................ | 463/1 |
| 7,753,756 B2 * | 7/2010 | McDermott et al. | .......... | 446/454 |
| 7,901,292 B1 * | 3/2011 | Uhlir et al. | ....................... | 463/42 |
| 7,991,492 B1 * | 8/2011 | Namanny et al. | ............... | 700/91 |
| 8,016,653 B2 * | 9/2011 | Pendleton et al. | ................ | 463/6 |
| 8,100,771 B2 * | 1/2012 | Maeda et al. | ................... | 463/42 |
| 8,182,348 B2 * | 5/2012 | Uhlir et al. | ....................... | 463/59 |
| 8,650,585 B2 * | 2/2014 | Arima | ................ | 725/1 |
| 2002/0169013 A1 * | 11/2002 | Serizawa et al. | ................. | 463/6 |
| 2004/0224741 A1 * | 11/2004 | Jen et al. | ............................ | 463/6 |
| 2005/0033601 A1 * | 2/2005 | Kirby et al. | ....................... | 705/1 |
| 2010/0160013 A1 | 6/2010 | Sanders | | |
| 2010/0305724 A1 * | 12/2010 | Fry et al. | .......................... | 700/92 |

* cited by examiner

*Primary Examiner* — Steven J Hylinski
(74) *Attorney, Agent, or Firm* — Jennifer M. Stec; Brooks Kushman P.C.

(57) ABSTRACT

A system includes a processor configured to communicate with a remote server to provide and obtain vehicle performance information, wherein the processor is further configured to receive and present a list of one or more available race opponents respond to the server with an opponent selection present a countdown timer and measure and report to the server one or more vehicle statistics relating to a race beginning at the end of the countdown timer.

5 Claims, 3 Drawing Sheets

METHOD AND APPARATUS FOR REMOTE RACING

TECHNICAL FIELD

The illustrative embodiments relate to methods and apparatuses for remote racing.

BACKGROUND

From digital content delivery, to on-demand directions, to streaming movies and internet feeds, modern infotainment systems provide vehicles with a variety of services for operators and passengers. Users can use network connections, such as a portable phone, to connect a vehicle computing system to a remote network, and this connection can provide access to a variety of data. While much of the data is similar to data one might request on a home-PC, there are certain functions that may be more desirable in a vehicle setting. For example, turn-by-turn directions with delivery upon reaching GPS coordinates. While it may be useful to get the directions beforehand, so a route is known, the delivery of the next-direction when a GPS coordinate is reached is something that is generally far more useful while actually in the vehicle.

Another example of an application that is vehicle-related is seen in U.S. App. 2010/0160013, which generally relates to a "Vehicle Tracking System and Game," integrating a GPS navigation system with invention specific hardware and software. A user installs a mobile unit on his race vehicle which features software allowing a processor connected to the electronics of the user's vehicle to communicate with an inertial navigation system which collects racing information, with a remote database which features software for various interactive real-time or virtual GPS Racing Games and processing the racing information of all users, and with a GPS system in real time. The mobile unit collects, processes, saves and transmits user specific racing information continuously throughout the game. This racing information is data of racing performance parameters specific to the game subscribed for by the user. The database processes and evaluates the received racing information, offsets this information with the users' basic input data and compares the information of all users.

SUMMARY

In a first illustrative embodiment, a system includes a processor configured to communicate with a remote server to provide and obtain vehicle performance information. The processor is further configured to receive and present a list of one or more available race opponents. The processor is also configured to respond to the server with an opponent selection, present a countdown timer and measure and report to the server one or more vehicle statistics relating to a race beginning at the end of the countdown timer.

In a second illustrative embodiment, a system includes a vehicle-based processor configured to receive criteria relating to a desired opponent for a virtual race, the virtual race occurring in real time between two opponents in varied geographic locations. The processor is also configured to, responsive to the criteria, present a list of possible opponents meeting the criteria. The processor is further configured to receive and transmit a selection of an opponent to a remote server.

Also, the processor is configured to receive confirmation of the selection, and, based on the confirmation of the selection, present a display relating to the start of the race. The processor is configured to receive confirmation from a vehicle driver that the driver is ready to begin the race. The processor is further configured to transmit the confirmation to the server and receive remote confirmation that the opponent is ready to begin the race.

Also, the processor is configured to receive a time designation to start a countdown timer, begin the countdown timer at the designated time, and record and report vehicle data developed during the duration of the race.

In a third illustrative embodiment, a computer-implemented method includes communicating from a vehicle computing system to a remote server to provide and obtain vehicle performance information. The method also includes receiving and presenting a list of one or more available race opponents. Also, the method includes responding to the server with an opponent selection. The method further includes presenting a countdown timer, and measuring and reporting to the server one or more vehicle statistics relating to a race beginning at the end of the countdown timer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
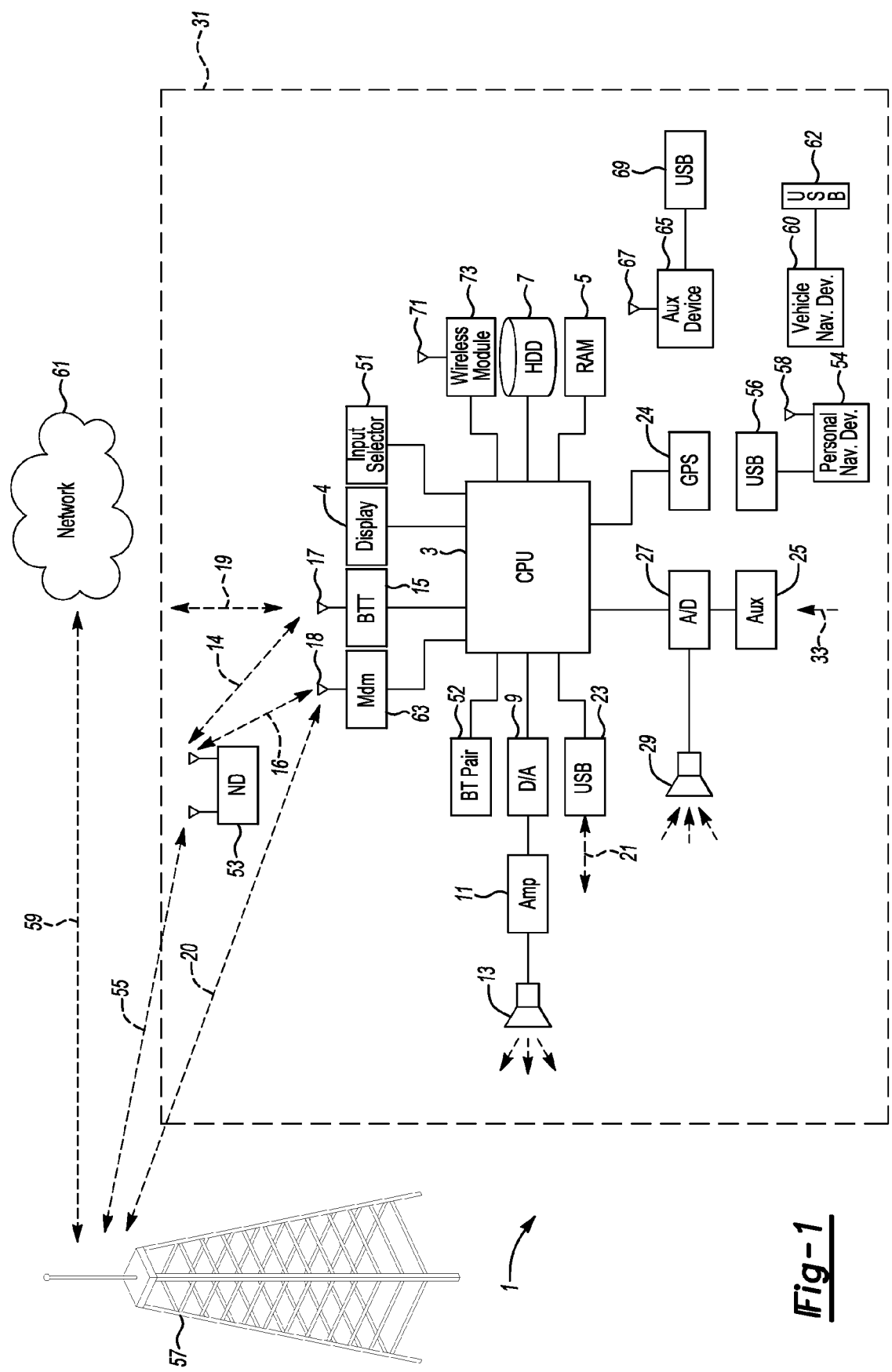
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
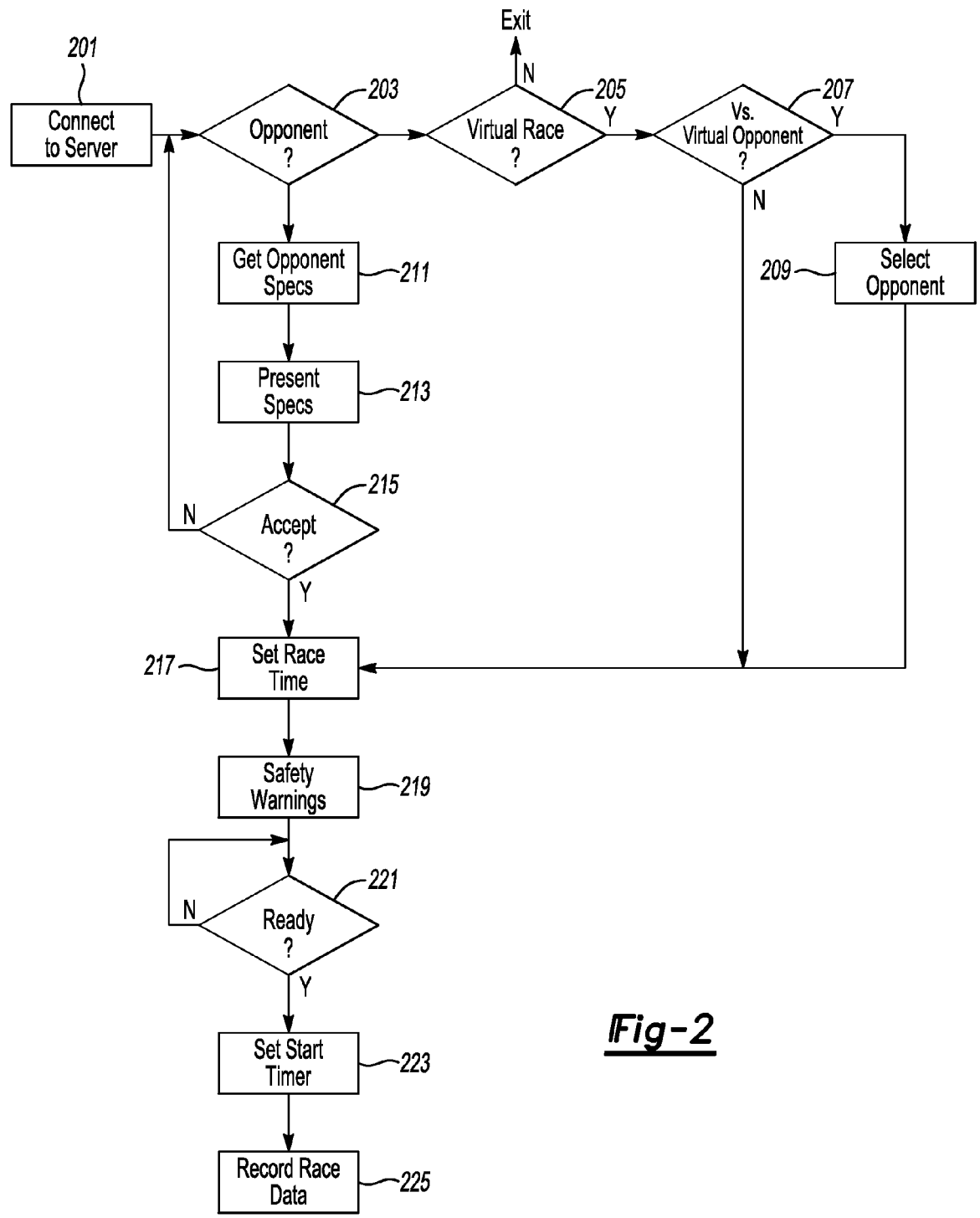
FIG. 2 shows an illustrative example of a race processing process.

FIG. 2 shows an illustrative example of a race processing process. In this illustrative example, the process could be enabled through the use of a VCS. A user may be part of an internet forum or other website where car enthusiasts get together to discuss vehicle modifications and racing techniques. Many of these people might like to race against each other, but may live scattered about the country or even about the world, and thus cannot directly compete, or can only do so at great cost.

One solution would be for these people to record their times and manually upload the time and vehicle information to a website for comparison. While informative, this is a somewhat subjective process and cannot accurately capture information with the same speed and degree as the actual in-vehicle recording systems. Accordingly, if there was a way that these people could accurately capture race data, and, in at least one instance, actually race in real time, their experience could be greatly improved.

In the example shown in FIG. 2, one operator is searching for another against whom to race. Presumably both have found a stretch of road or race course where such behavior is both permitted and safe. Distances and other features of the road can be input, and there is the possibility that, for known race tracks, track data can be accessed and included from an online database or other resource.

In the illustrative example shown in FIG. 2, a driver's vehicle connects to a server 201, to search for an opponent or to provide a driver with an option to race against either previously stored data or a virtual opponent. In at least one embodiment, the driver may be given a user-name or code that another opponent could input so that both drivers could easily find each other online and know that the other is available for a race.

In this example, after connecting to a server, the driver is asked to select whether a real opponent is desired or not 203. In this example, there may be two types of real opponents, live opponents and stored opponents. For example, if Driver A wants to run a race at 8 AM on Friday, and Driver B can only run the race after noon, Driver A could record all the relevant race data from his race at 8 AM and then at noon, Driver B could "race" against that data in real time for Driver B. Driver A could then be presented with a report showing the outcome of the race.

If no opponent is desired, the process may ask if a virtual opponent is desired 205. In this example, a virtual opponent could be defined in a number of ways. One type of virtual opponent could be developed from all of a particular driver's own times. Or it could be developed from that driver's best performance. These options allow a driver to race against themselves for improvement and comparison purposes.

For example, if Driver A added some new parts to his vehicle, he may want to test the performance of that vehicle with those parts against his long time averages or current best performance. By racing against himself and comparing the data and results, the driver can tell if there is a measurable increase in performance based on the addition of the parts.

In another example, the virtual opponent may be the average or best of all cars of a similar model. Since a large database can be had online, drivers can virtually race against a number of conceivable models. Drivers could specify certain modifications to engines for opponents, certain model versions of vehicles, vehicle classes, almost anything, in order to assemble a virtual opponent from the available data.

If the driver does not want a virtual race 205, in this example, the process exits. If the driver does want a virtual race, the system determines if a virtual opponent is desired 207. As previously noted, the virtual opponent is assembled based on one or more parameters defining some classification of opponent, using data pulled from a general or driver specific database, in this non-limiting example.

Once an opponent has been determine and selected 209, the process can continue with that opponent as the driver's opponent. In the example where no opponent is desired, the race can be for data gathering purposes, and can be run as normal, but without the addition of an opponent.

If the driver wants to race a "real" opponent 203, the system may provide the driver with the specifications of one or more currently available opponents 211. In this example, there may be some amount of data and or desired opponent specifications that is passed to the remote server in order to aid in selection of an opponent, this can aid a driver in selection of the opponent. In the case that the opponent is actually online, i.e., the race will occur in real-time, the driver may also present some system/vehicle specifications to the system 213 so that the opponent can view these to determine whether or not the driver is a suitable opponent.

If both parties accept the challenge 215, the race can continue. In at least one example, the "real" opponent is a real party who had previously recorded race stats. In this example, either based on a user identification or some number of user characteristics, for example, the driver will have selected this real opponent for comparison purposes, and thus the opponent, who will not be racing in real time, does not need to confirm the acceptability of the race.

Once the racers have accepted, the process may set a race time 217. For example, the race time may be set five or ten minutes from the acceptance, just to ensure the drivers have adequate time to prepare, make sure the course is safe, etc. At this point, and likely throughout the process, bold and highly audible and visible safety warnings may be presented 219. Among other things, these may warn drivers only to race on authorized tracks, not to exceed posted speeds and/or safe speeds, and any other conceivable warnings that could serve to terminate OEM liability.

If the agreed-upon time has arrived and the drivers have both been warned, the process may attempt to determine if the drivers are ready 221. This means the driver will confirm that the track is clear, the driver has the allotted time and permission to go, etc. Once both drivers are ready, a count-down timer can be presented 223 to signal the start of the race, and race data can be recorded 225.

Since there may be some measure of delay in reporting data between vehicles, start timers, in one instance, can be generated by each vehicle on their own (as opposed to using a server-based common timer). This can ensure that a hiccup in communication does not cause one driver to start significantly later than another driver. In another example, the system can record data both from the "go" portion of the timer and from when an acceleration pedal is actually pressed, following the "go." The driver could use this data to see either his real movement stats (i.e., from when the vehicle began to move) or his delay in timing (how far off from the "go" was he before movement occurred).

Figure 3:
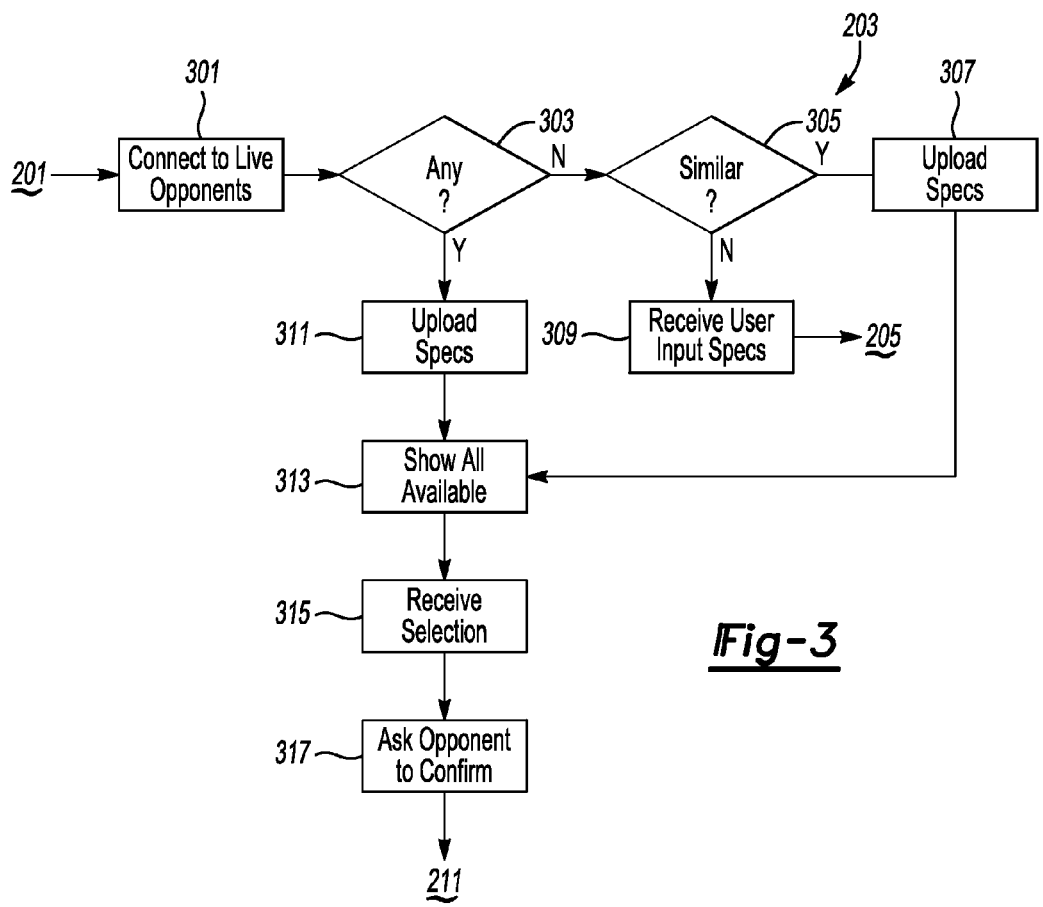
FIG. 3 shows an illustrative example of an opponent selection process.

FIG. 3 shows an illustrative example of an opponent selection process. This is one non-limiting sub-set of the possible process for selection of an opponent on a live server. Although numerous combinations of selection criteria are shown and discussed, these are intended to serve as examples only, and do not exclusively define criteria and methods for opponent selection.

In this illustrative example, the process connects to a list of live opponents 301. In this example, the discussion will be focused around real-time opponents, i.e., those that will race at the same time as a driver. Obviously, more than two vehicles could also be engaged in any of the activities presented herein at any one time (e.g., four-person race).

In this illustrative example, the process first asks the driver if they would like to race against simply "any" opponent available 303. This would give the widest selection of choices, but could result in a race against a very differently built vehicle. On the other hand, it may be fun to race a Mustang against an Explorer, for not better reason than to see the differences in acceleration and top speed achievement.

If the driver selects "any", the drivers own specifications are uploaded to the server 311. Since the opponent, in this example, will also agree to the race, the opponent may like to know what sort of vehicle the other driver is driving. Plus, this data can be used to sort out opponents who would likely agree to a race. For example, if twenty people online are willing to race against a stock Mustang, then uploading data corresponding to a stock Mustang would produce those twenty opponents as possible opponents. On the other hand, it may also be used to weed out data from someone who wants to race their Focus against other Focuses (and thus would not agree to the race).

In another part of the process, the driver may not simply wish to race against "any" opponent, so may then be given an option to race against "similar" opponents 305. In this example, selection of similar opponents could cause an uploading of specifications 307 and then a presentation of options of drivers who corresponded to the similar category 313. Again, there is the possibility that these selections will be further sorted based on likelihood of the opponents being willing to accept the particular challenge.

If the driver doesn't want "any" opponent and doesn't want a "similar" opponent, then, in this example, the assumption is made that the driver wants to race against some specified version of an opponent 309. Alternatively, the driver may not want an actual opponent at all, and may simply want to record race data for the driver's own interest and viewing.

If the driver inputs any number of specifications about opponents (number of cylinders, engine size, car models, etc.), this data can then be uploaded and used (along with driver data about the driver's vehicle) to determine a list of opponents for selection 313. Once the list has been presented to the driver, the driver can select an opponent from the list 315 (or, in at least one instance, rank a number of opponents in case one or more opponents declines or is unavailable).

Once the selected opponent has been chosen, the process can send a request to the server to ask the opponent to confirm the race 317.

Figure 4:
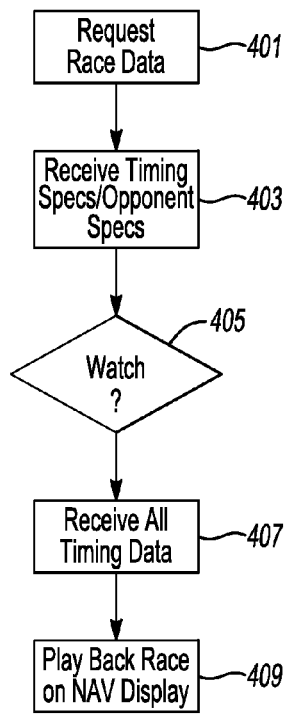
FIG. 4 shows an illustrative example of a race recreation process.

FIG. 4 shows an illustrative example of a race recreation process. In this illustrative example, a driver will be able to see what a race would have looked like, if the race had been run with two (or more) vehicles side-by-side. In this example, the driver will use a PC or the vehicle nav display to view the outcome of a race, and see where the vehicles were running relative to each other throughout the race.

In this example, the driver sends a request to the server for race-related data. The data can relate to an individual run or a multi-vehicle race. In one example, the driver can compare his last-run data against personal averages or bests. In response to the request, the driver receives any relevant data relating both to his personal data and any opponent data that may be available 403. In this example, the driver is given an option to watch a recreation of the race 405. If this option is selected, either the server or the vehicle will build a recreation of what the race could have looked like. This could be a relatively simple process or could utilize a higher degree of graphics and processing to recreate a more visually accurate representation of the race. Views from the cockpit, above, rear-view, etc. could all be available with sufficient processing power.

The relevant timing data and any graphical data built on the server can all be downloaded in response to the watch race request 307. This data can then be used to present some playback of the race on a driver's nav display 409, connected phone, or other graphically capable device (such as a PC).

Figure 5:
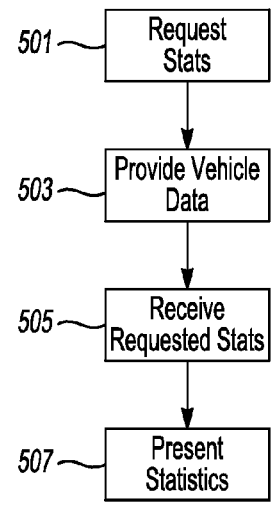
FIG. 5 shows an illustrative example of a data presentation process.

FIG. 5 shows an illustrative example of a data presentation process. In this illustrative example, a driver has requested one or more pieces of statistical data relating to one or more races 501. Alternatively, data relating to an opponent could be requested. Or, for example, lifetime performance data, performance data for a specific vehicle, etc.

In this example, the request includes vehicle data 503 so that a server can pull data that is related to the particular vehicle, if desired. The requested statistics are received back at the vehicle 505 and then presented to the user 507. Presentation could be audio, visual or in any other appropriate format. The full data set could be emailed/texted to a user, or a selected portion of the data set could be sent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
an automobile installed processor configured to:
receive criteria defining desired opponent characteristics for a real-time race between two opponents driving physical automobiles in varied locations;
receive opponent selection, by an automobile driver who input the criteria, from presented opponents meeting the criteria;
receive confirmation from the driver that the driver is ready to begin the race;
begin the race at a driver-designated start-time; and
record and report automobile data developed during the race.

2. The system of claim 1, wherein the criteria includes an automobile configuration.

3. The system of claim 1, wherein the criteria includes an engine size.

4. The system of claim 1, wherein the criteria includes a number of cylinders.

5. The system of claim 1, wherein the criteria identifies a specific opponent.

* * * * *

UNITED STATES PATENT AND TRADEMARK OFFICE
CERTIFICATE OF CORRECTION

| | | |
|---|---|---|
| PATENT NO. | : 9,248,378 B2 | Page 1 of 1 |
| APPLICATION NO. | : 13/587058 | |
| DATED | : February 2, 2016 | |
| INVENTOR(S) | : Joe Phillip Pierucci and Shawn Daniel Brozovich | |

It is certified that error appears in the above-identified patent and that said Letters Patent is hereby corrected as shown below:

In the claims,

Column 8, Line 43, Claim 1

After "an", delete "automobile installed" and insert --automobile-installed--

Signed and Sealed this
Twelfth Day of April, 2016

Michelle K. Lee
*Director of the United States Patent and Trademark Office*